United States Patent
Stone et al.

(10) Patent No.: US 8,028,658 B2
(45) Date of Patent: *Oct. 4, 2011

(54) LIQUID BIRD FEEDER

(75) Inventors: John Stone, Southboro, MA (US);
Oliver McLachlan, Boston, MA (US);
David Harting, Needham, MA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,126

(22) Filed: Feb. 25, 2010

(65) Prior Publication Data

US 2010/0229801 A1     Sep. 16, 2010

Related U.S. Application Data

(63) Continuation of application No. 11/434,369, filed on May 15, 2006, now Pat. No. 7,685,969.

(51) Int. Cl.
*A01K 7/00* (2006.01)

(52) U.S. Cl. ........... 119/72; 119/77; 119/57.8; 119/52.2

(58) Field of Classification Search ............. 119/72, 119/72.5, 75, 76, 78–80, 51.5, 52.2, 58.7, 119/73, 74, 77; D30/121, 131; 449/10–12
See application file for complete search history.

(56) References Cited

U.S. PATENT DOCUMENTS

| | | | |
|---|---|---|---|
| 516,600 A | 3/1894 | Higgins | |
| 3,292,589 A * | 12/1966 | Williams | 119/77 |
| 4,691,665 A | 9/1987 | Hefner | |
| 5,303,674 A | 4/1994 | Hyde, Jr. | |
| 6,718,911 B2 * | 4/2004 | Greenberg | 119/51.5 |
| 2003/0097995 A1 | 5/2003 | Garcia-Lucio et al. | |

* cited by examiner

*Primary Examiner* — Joshua Michener
(74) *Attorney, Agent, or Firm* — Jacobson Holman PLLC

(57) ABSTRACT

A liquid bird feeder provides a liquid container having a bottom opening, a liquid tray adapted to attach to the liquid container and adapted to immerse the bottom opening in liquid. The liquid tray includes a bottom port passing through the liquid tray and vertically aligned with the bottom opening, and a valve mechanism adapted to selectively couple the bottom port of the liquid tray to the bottom opening for filling purposes, or to close the bottom port and couple the bottom opening to the liquid tray for supplying liquid from the liquid container to the liquid tray.

23 Claims, 5 Drawing Sheets

LIQUID BIRD FEEDER

This application is a continuation application of U.S. Ser. No. 11/434,369 filed May 15, 2006, now U.S. Pat. No. 7,685,969 the priority of which is hereby claimed.

BACKGROUND OF THE INVENTION

1. Field of the Invention

The present invention generally relates to liquid bird feeders, and in particular to such bird feeders which provide for inverted filling while minimizing residual liquid spillage.

2. Description of the Prior Art

Liquid nectar bird feeders are used for specifically attracting hummingbirds in the same manner as seed feeders are used to attract other birds. Some may consider liquid nectar feeders to be less convenient however, because of the liquid auto-feed structure. Filling liquid feeders commonly requires inversion of the feeder and certain liquid spillage from this action.

It is therefore desirable to have a liquid nectar feeder which minimizes liquid spillage during filling.

SUMMARY OF THE INVENTION

One embodiment of the present invention provides a liquid bird feeder, comprising a liquid container having a bottom opening, a liquid tray adapted to attach to the liquid container and adapted to immerse the bottom opening in liquid, wherein the liquid tray includes a bottom port passing through the liquid tray and vertically aligned with the bottom opening, and a valve mechanism adapted to selectively couple the bottom port of the liquid tray to the bottom opening for filling purposes, or to close the bottom port and couple the bottom opening to the liquid tray for supplying liquid from the liquid container to the liquid tray.

The liquid tray may include a concave bottom surface located adjacent to the bottom port and adapted to act as a funnel or collector for filling the liquid container through the bottom port. The bird feeder may further comprise a valve actuator handle extending through the bottom port. The valve actuator handle may be located within the concave bottom surface of the liquid tray. The concave bottom surface may surround the bottom port.

The liquid tray may include a top cover enclosing the liquid tray and adapted to avoid liquid spillage from the liquid tray during inversion of the bird feeder. The liquid tray top cover may include one or more feeding ports which extend below the bottom opening when the bird feeder is in an upright position, and thus below a normal liquid level in the liquid tray. The top cover may enclose sufficient volume to keep the bird feeder ports above a normal liquid level when the bird feeder is inverted.

In another embodiment, the present invention provides a liquid bird feeder, comprising a liquid container having a bottom opening, a liquid tray adapted to attach to the liquid container and adapted to immerse the bottom opening in liquid, a cylindrical collar forming a bottom port of the liquid tray and extending through the liquid tray and the bottom opening, and a stopper adapted for closing the cylindrical collar from beneath the liquid tray. The cylindrical collar is adapted to allow filling of the liquid container through the bottom port by removal of the stopper and locating the feeder in an inverted position, and further adapted to allow liquid flow from the liquid container into the liquid tray with the stopper closing the cylindrical collar and the feeder located in an upright position.

The bottom opening may be larger than an outer diameter of the cylindrical collar. The liquid container may include a cylindrical extension forming the bottom opening and extending downwardly around a top end of the cylindrical collar.

The liquid tray may include a concave bottom surface located adjacent to the bottom port and adapted to act as a funnel or collector for filling the liquid container through the bottom port. The bird feeder may further comprise a stopper grip extending through the bottom port. The stopper grip may be located within the concave bottom surface of the liquid tray. The concave bottom surface may surround the bottom port.

The liquid tray may include a top cover enclosing the liquid tray and adapted to avoid spillage from the liquid tray during inversion of the bird feeder. The liquid tray top cover may include one or more feeding ports which extend below the bottom opening of the liquid container when the bird feeder is in an upright position, and thus below a normal liquid level in the liquid tray. The top cover may enclose sufficient volume to keep the bird feeder ports above a normal liquid level when the bird feeder is inverted.

BRIEF DESCRIPTION OF THE DRAWINGS

The present invention is illustratively shown and described in reference to the accompanying drawings, in which.

DETAILED DESCRIPTION OF THE PREFERRED EMBODIMENTS

Figure 1:
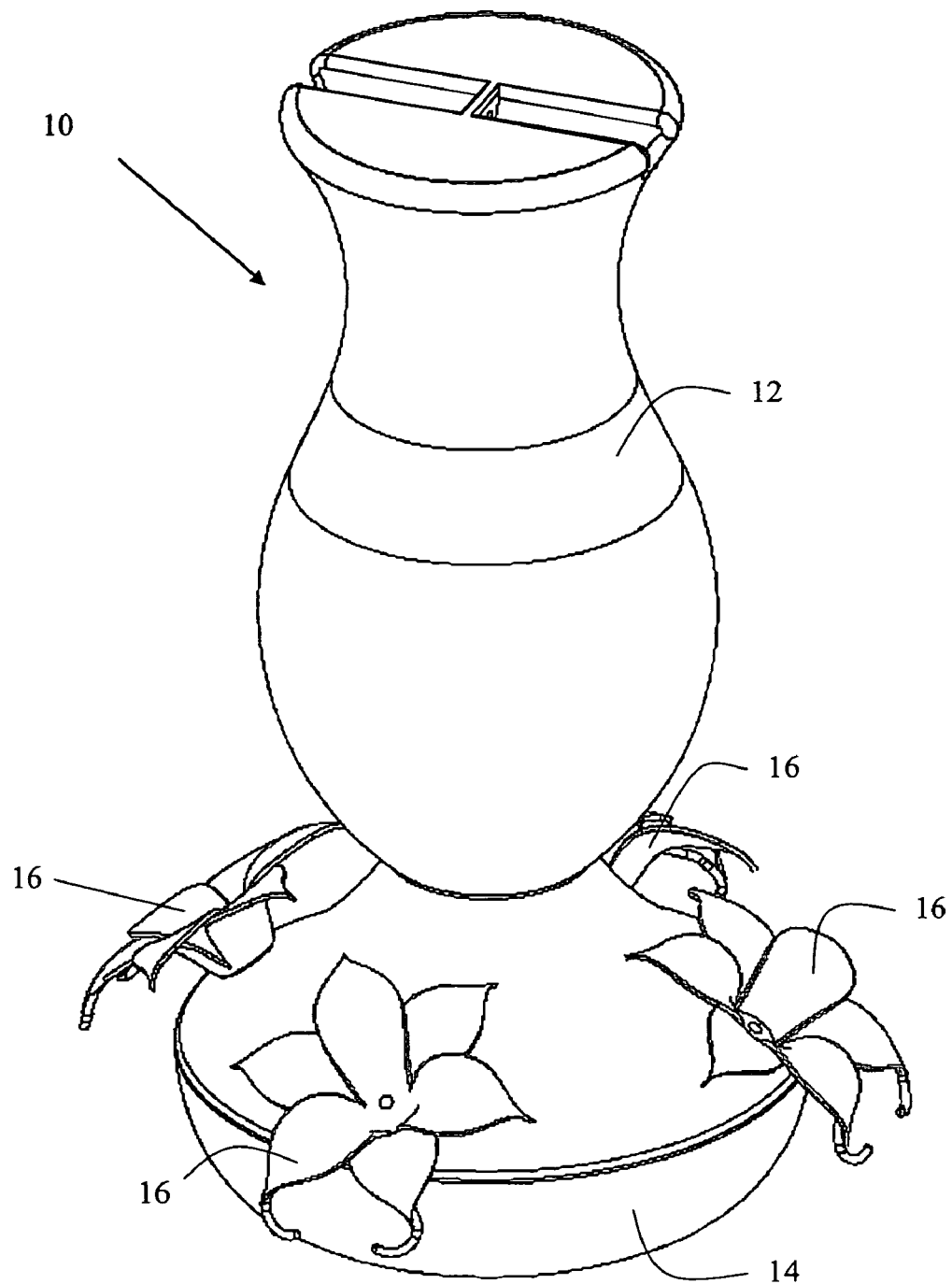
FIG. 1 is a perspective view of a liquid bird feeder constructed in accordance with one embodiment of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a liquid bird feeder 10, which generally includes a liquid container 12 and a liquid tray 14. Tray 14 further includes a multiplicity of flower-like bird feeding ports 16.

Figure 2:
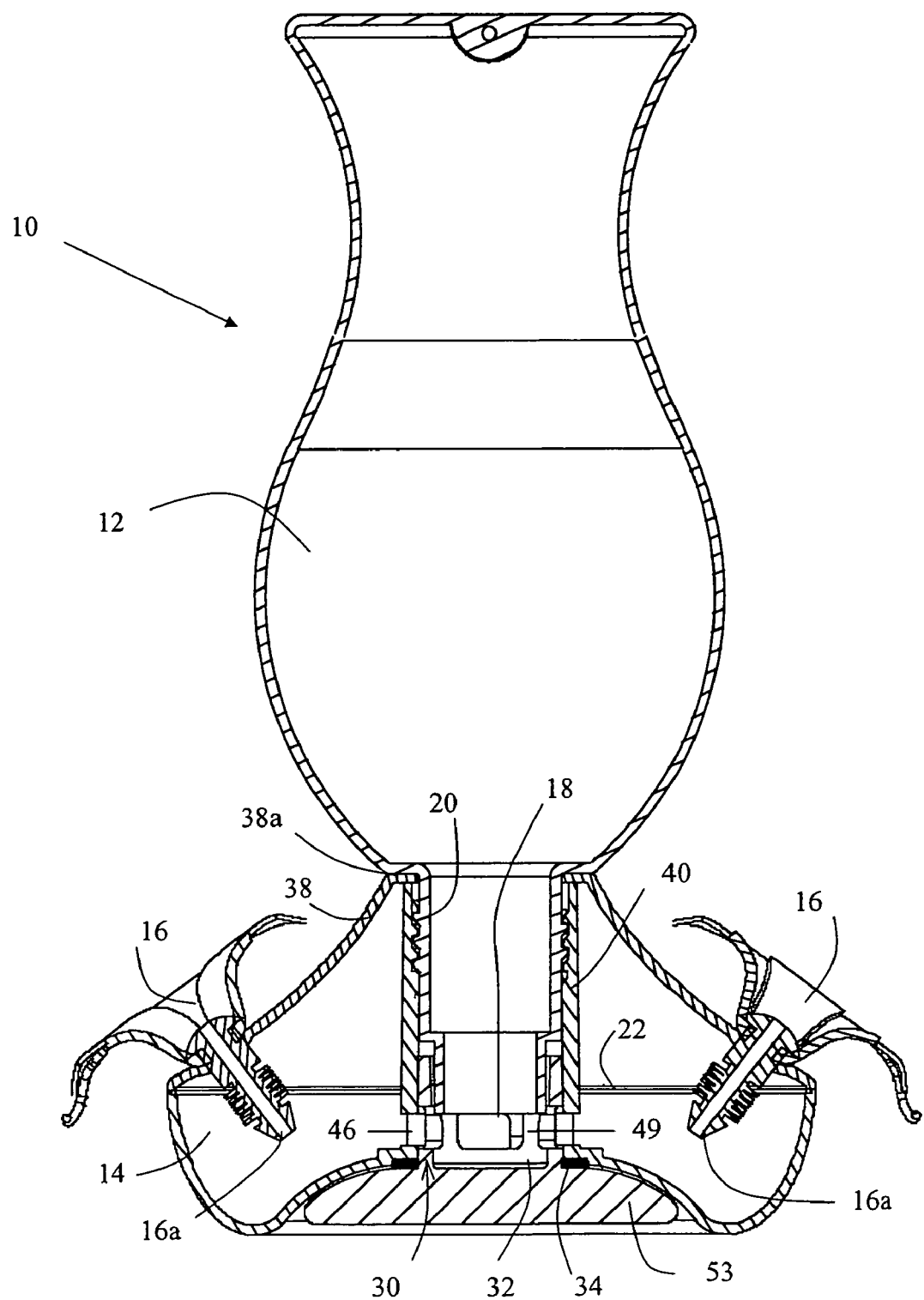
FIG. 2 is a central cross sectional view of the bird feeder of FIG. 1.

FIG. 2 shows a centrally located, cross section of bird feeder 10 including the same liquid container 12, liquid tray 14, and feeding ports 16. FIG. 2 further shows liquid container 12 to have a bottom opening 18 formed by a cylindrical extension 20. Container 12 is also shown to be otherwise closed. It should be noted that bottom opening 18 extends below an upper edge 22 of liquid tray 14. This allows the gradual feeding of liquid from liquid container 12 into tray 14 when the liquid level within tray 14 is below the bottom opening 18. Whenever the liquid level in tray 14 is above bottom opening 18, a vacuum created above the liquid located within liquid container 12 prevents further flow into tray 14. This is a normal liquid level for enabling bird feeding.

Liquid tray 14 includes bottom port 30 which passes through liquid tray 14 and is vertically aligned with bottom opening 18. Port 30 is closed by a valve 32, which is constructed to either allow the filling of liquid container 12 when feeder 10 is in an inverted position or to allow the normal flow of liquid into tray 14 when feeder is in an upright position. Valve 32 closes port 30 by means of a seal 34.

Also shown in FIG. 2 is a cover 38 for liquid tray 14 that is located between liquid container 12 and tray 14. Feeding ports 16 are mounted in cover 38 and are shown to have lower ends 16a which extend below bottom opening 18 and thus below the normal liquid level which would be maintained at or about bottom opening 18. When feeder 10 is inverted for filling, cover 38 has sufficient volume to contain the liquid from tray 14 and thus spillage is prevented. In this inverted position, the ends 16a normally extend above the normal liquid level to be expected. Optionally, the top 38a of cover 38 may include a seal of any suitable nature with which container 12 or top 38a may be sealed during construction of feeder 10 to prevent any seepage.

Figure 3:
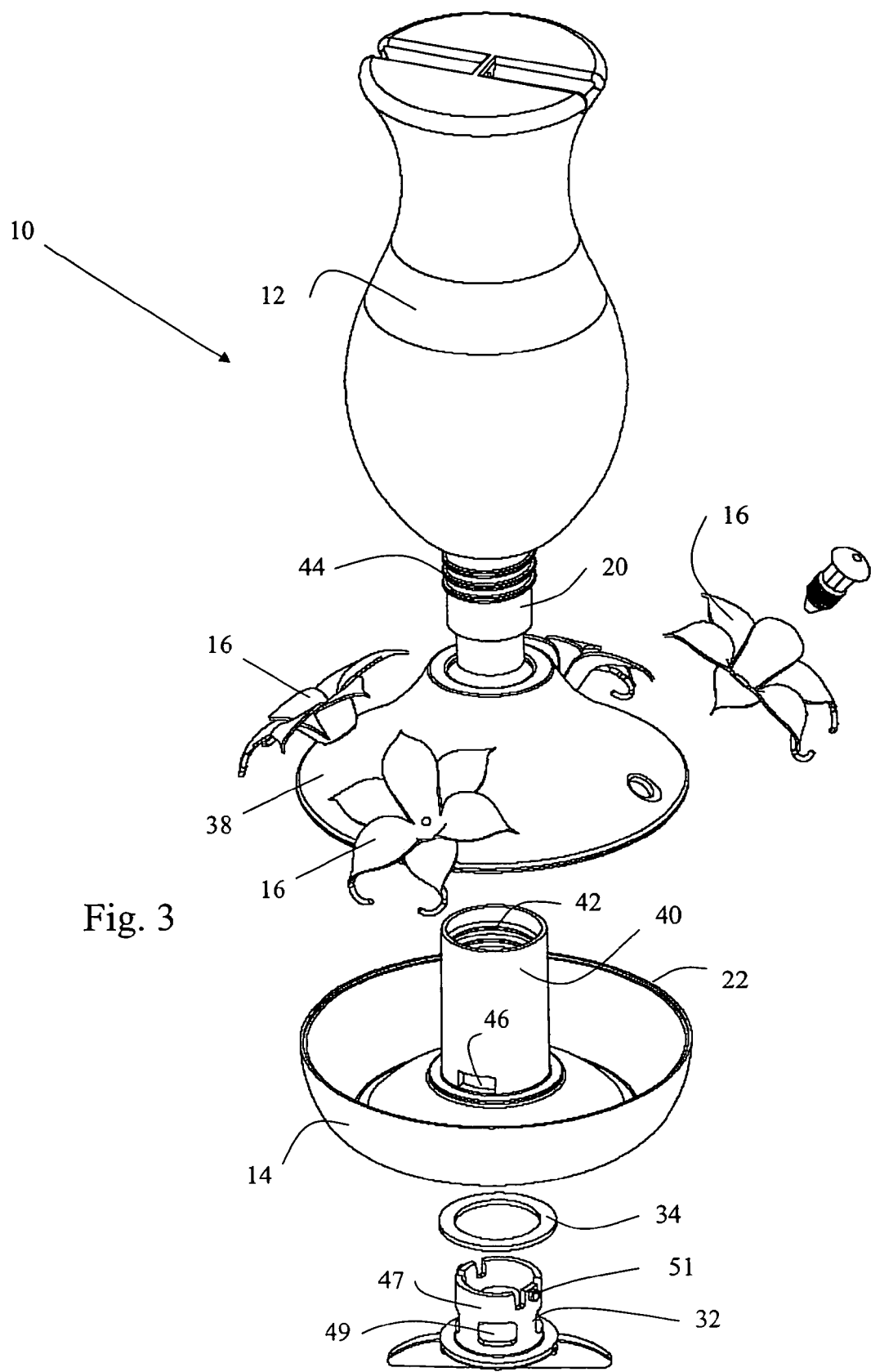
FIG. 3 is an exploded view of the bird feeder of FIGS. 1 and 2.

FIG. 3 shows an exploded view of bird feeder 10. Liquid tray 14 also includes a cylindrical collar 40, which forms the bottom port 30 (FIG. 2). Cylindrical collar 40 includes female thread 42 adapted to mate with a male thread 44 located on cylindrical extension 20. When tray 14 is attached to container 12 in this manner, tray cover 38 is squeezed therebetween. Cylindrical collar 40 also includes a port 46 located in its side wall. Valve 32 is also shown in FIG. 3 with a cylindrical construction 47 having lateral port 49. In reference to FIG. 2, when valve 32 closes port 30, the alignment of ports 46 and 49 allows liquid to flow from liquid container 12 into liquid tray 14.

Figure 4:
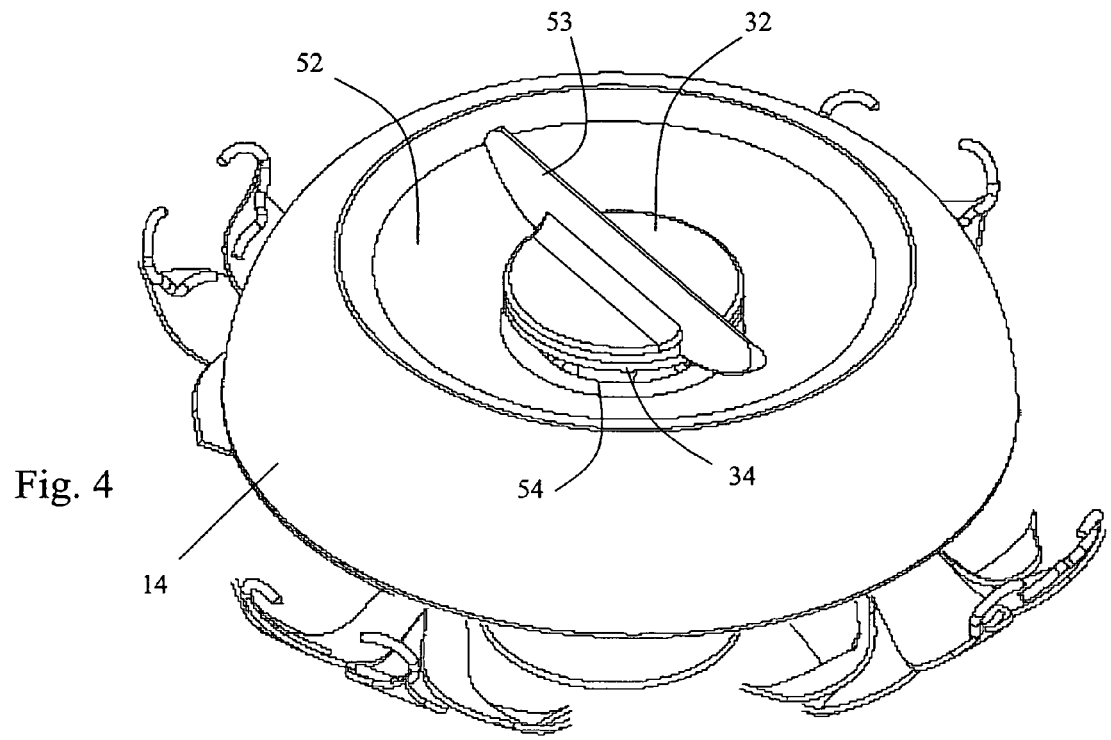
FIG. 4 is a bottom view of the bird feeder of FIGS. 1-3.
Figure 5:
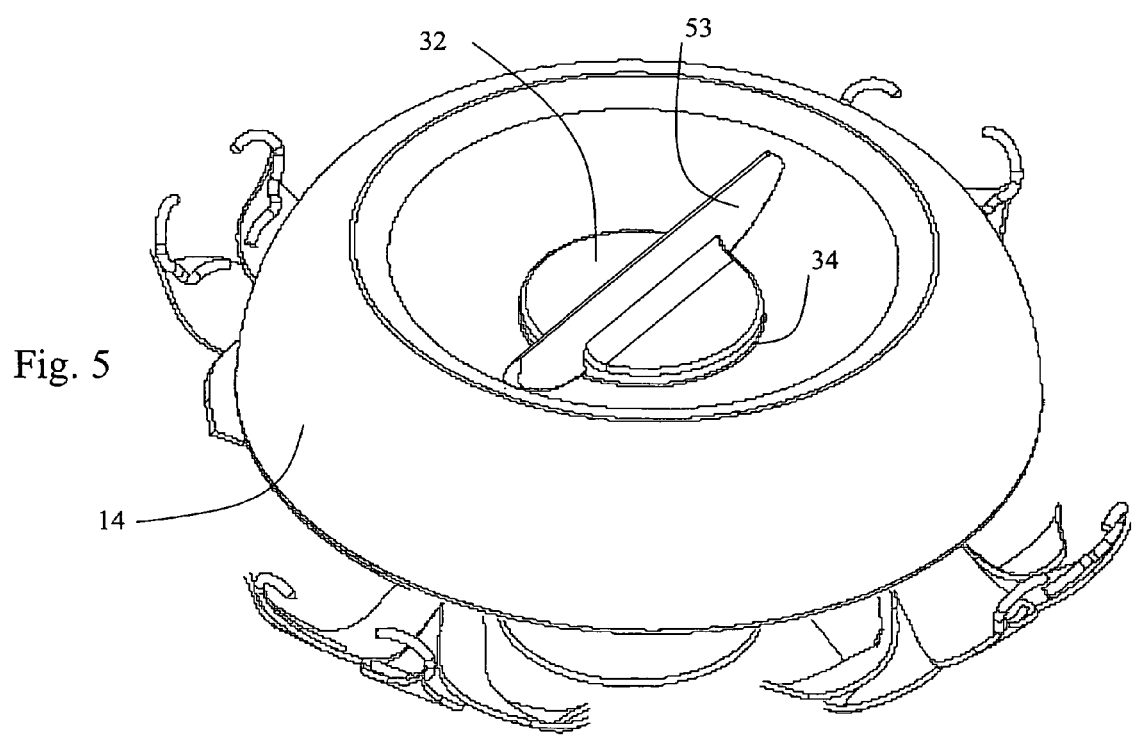
FIG. 5 is a similar bottom view of the bird feeder of FIGS. 1-3 with a component being located in another operative position.

FIGS. 4 and 5 show bottom views of liquid tray 14 which differ in that valve 32 is located in respective opened and closed positions. Tray 14 is shown to include a concave depression 52 which is adapted to work as a funnel for liquid being poured into feeder 10. Concave depression 52 is shown to fully contain a grip or handle 53 for valve 32. In the open position of FIG. 4, a space 54 is provided between seal 34 and tray 14. This allows liquid poured into depression 52 to flow into liquid container 12. In FIG. 5, valve 32 is shown in a closed position with no similar space shown adjacent to seal 34. The variation in the vertical position between tray 14 and valve 32 with the rotation of valve 32 can be caused by any suitable thread arrangement, such as thread follower 51 (FIG. 3) on valve 32 and a corresponding thread or channel (not shown) on the inside surface of cylindrical extension 40. Any suitable valve design may be used. Functionally, container 12 is connected to tray 14 when valve 32 is closed, and container 12 is connected to port 30 and not tray 14 when valve 32 is open.

Figure 6:
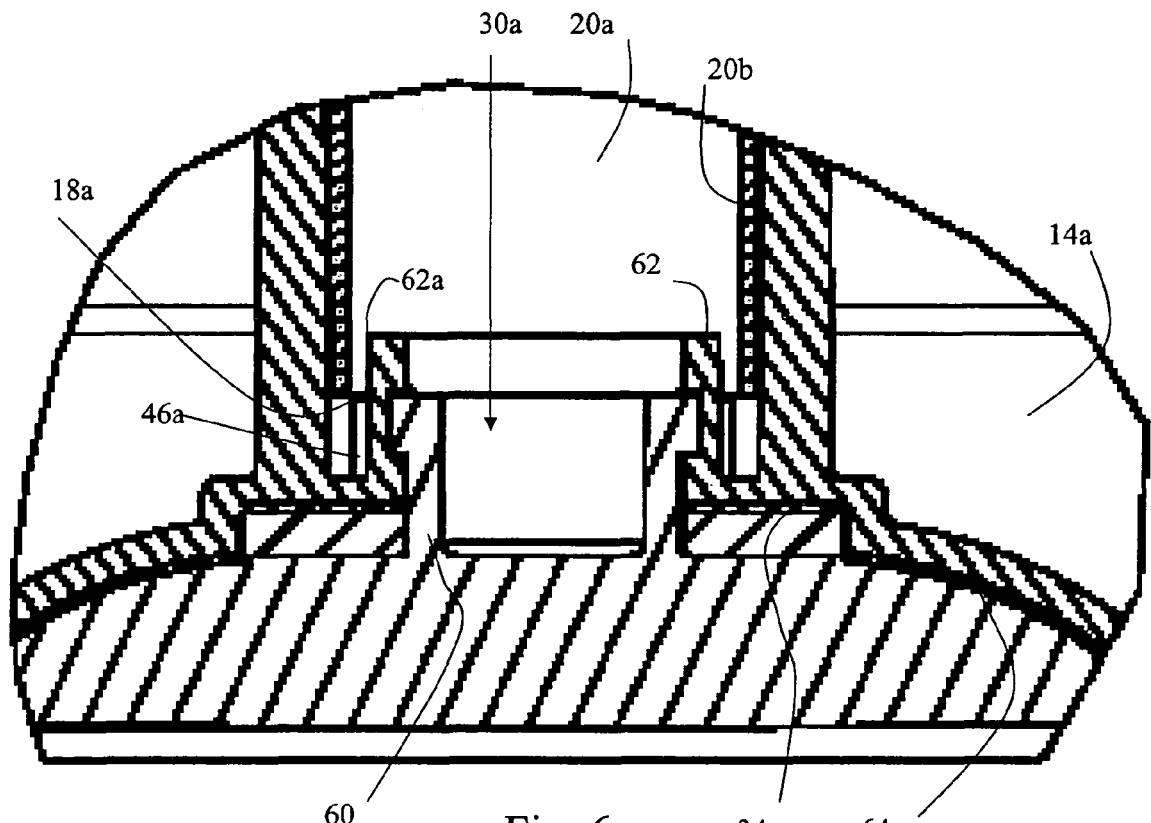
FIG. 6 is a partial cross sectional view of an alternative embodiment of the present invention.

FIG. 6 shows a cross sectional view of an alternate valve or stopper 60, being used to close the bottom of port 30a. Liquid tray 14a is shown to include an additional cylindrical collar 62, which is aligned with and extends into bottom opening 18a of cylindrical extension 20a. The outer diameter 62a of cylindrical collar 62 is smaller than the inner diameter 20b of cylindrical extension 20a and bottom opening 18a.

Figure 7:
FIG. 7 is a perspective view of the stopper shown in FIG. 6, as removed from the feeder.

As shown in FIG. 7, stopper 60 is intended for complete removal from tray 14a when liquid feed is poured through bottom port 30a of tray 14a. Thus, liquid feed flows directly through cylindrical extension 20a and it does not enter liquid tray 14a. Tray 14a includes a concave depression 64 to act as a funnel. Thus, when stopper 60 closes port 30a, as shown in FIG. 6, and the feeder is turned upright, liquid is allowed to flow through extension 20a, around the outside of cylindrical collar 62 and through port 46a into tray 14a. Any suitable means may be used to secure stopper 60 in port 30a against a washer 34a, including a threaded engagement sufficient to maintain a liquid seal.

Thus, the present invention provides a liquid bird feeder which is well adapted for refilling, while minimizing spillage of residual liquid feed.

It is now apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A liquid bird feeder, comprising:
a liquid container having a bottom opening;
a liquid tray coupled to said liquid container and, when said liquid container is filled with liquid, said tray immersing said bottom opening in liquid, said liquid tray including a bottom port passing through said liquid tray and functionally aligned with said bottom opening; and
a valve connected to at least one of said liquid container and said liquid tray and movable in two opposing directions to reach a first position upon movement in one direction and a second position upon movement in an opposite direction while remaining connected when moved in either direction, said valve including a port therein that is closed when said valve is in said first position and opened when said valve is in said second position, said valve in said first position creating a liquid flow path from said bottom port of said liquid tray to said bottom opening to enable said liquid container to be filled through said bottom port when said bird feeder is inverted, and said valve in said second position closing said bottom port and creating a liquid flow path from said bottom opening to said liquid tray to allow liquid to flow from said liquid container into said liquid tray when said bird feeder is upright.

2. The bird feeder of claim 1, wherein said valve is rotatably engaged with at least one of said liquid container and said liquid tray so as be rotatable clockwise and counterclockwise between said first and second positions.

3. The bird feeder of claim 2, wherein said liquid tray includes a concave bottom surface located adjacent to said bottom port and adapted to act as a funnel or collector for filling said liquid container through said bottom port.

4. The bird feeder of claim 3, wherein said valve has a handle accessible from outside of the feeder for rotating said valve.

5. The bird feeder of claim 4, wherein said valve handle is located within said concave bottom surface of said liquid tray.

6. The bird feeder of claim 3, wherein said concave bottom surface surrounds said bottom port.

7. The bird feeder of claim 1, wherein said liquid tray includes a top cover enclosing said liquid tray and adapted to avoid liquid spillage from said liquid tray during inversion of said bird feeder.

8. The bird feeder of claim 7, wherein said liquid tray top cover includes one or more feeding ports which extend below said bottom opening when said bird feeder is in an upright position, and thus below a normal liquid level in said liquid tray.

9. The bird feeder of claim 8, wherein said top cover encloses sufficient volume to keep said feeding ports above a normal liquid level when said bird feeder is inverted.

10. The bird feeder of claim 1, wherein said tray includes a valve-receiving element into which said valve is received when said valve is connected to said tray.

11. The bird feeder of claim 10, wherein said valve is rotatably movable within said valve-receiving element.

12. A bottom-fill liquid bird feeder, comprising:
a liquid container having a bottom opening at a lower end thereof;
a liquid tray engaged with the lower end of said liquid container so that liquid in said liquid tray immerses said bottom opening in said liquid when said feeder is upright, said liquid tray including a valve-receiving element and a bottom port in communication with said bottom opening; and
a valve rotatably engaged with said valve-receiving element and movable with respect to said valve-receiving element between first and second positions while remaining in engagement with said valve-receiving element, said valve in the first position selectively opening a flow path from said bottom port of said liquid tray along said valve and to said bottom opening to enable said liquid container to be filled through said bottom port when the feeder is inverted and, in the second position, said valve closing said bottom port and creating a flow path from said bottom opening through said valve and to said liquid tray to allow liquid to flow from said liquid container into said liquid tray when said feeder is upright.

13. The bird feeder of claim 12, wherein said valve includes a port therein that is closed when said valve is in said first position and opened when said valve is in said second position.

14. The bird feeder of claim 12, wherein said valve is rotatably movable in clockwise and counterclockwise directions to move between said first and second positions.

15. The bird feeder of claim 14, wherein said valve includes a port therein that is closed when said valve is in said first position and opened when said valve is in said second position.

16. The bird feeder of claim 12, wherein said liquid tray, when in an in-use position with said feeder upright, includes a concave outer bottom surface located adjacent to said bottom port and adapted to act as a funnel or collector for filling said liquid container through said bottom port when said feeder is inverted.

17. The bird feeder of claim 12, wherein said valve-receiving element includes a collar.

18. The bird feeder of claim 17, wherein said collar has a sidewall with at least one sidewall port therein, said valve having a lateral port that aligns with said collar sidewall port when said valve is in said second position.

19. A liquid bird feeder, comprising:
a liquid container having a bottom opening;
a liquid tray coupled to said liquid container and, when said liquid container is filled with liquid, said tray immersing said bottom opening in liquid, said liquid tray including a bottom port passing through said liquid tray and functionally aligned with said bottom opening;
a valve-receiving element associated with at least one of said liquid container and said liquid tray; and
a valve engaged with said valve-receiving element and movable with respect to said valve-receiving element between first and second positions while remaining in engagement with said valve-receiving element in both positions, said valve in said first position creating a liquid flow path from said bottom port of said liquid tray to said bottom opening to enable said liquid container to be filled through said bottom port when said bird feeder is inverted, and said valve in said second position closing said bottom port and creating a liquid flow path from said bottom opening through said valve and to said liquid tray to allow liquid to flow from said liquid container into said liquid tray when said bird feeder is upright.

20. The bird feeder of claim 19, wherein said valve-receiving element includes a collar, said valve being rotatably movable in clockwise and counterclockwise directions to move axially with respect to said collar between said first and second positions.

21. The bird feeder of claim 20, wherein said valve includes a thread follower that engages with an inside surface of said collar as said valve moves between said first and second positions.

22. The bird feeder of claim 20, wherein said collar has a sidewall with at least one sidewall port therein, said valve having a lateral port that aligns with said collar sidewall port when said valve is in said second position.

23. The bird feeder of claim 19, wherein said valve in said first position prevents liquid from flowing into said liquid tray.

* * * * *